(12) United States Patent
Huang

(10) Patent No.: US 7,509,969 B2
(45) Date of Patent: Mar. 31, 2009

(54) TWO-WAY CHECK VALVE

(76) Inventor: Teng-Wen Huang, No. 4, Lane 30, Wu Chuan, St. Panchiao City, Taipei Hsien (TW)

( * ) Notice: Subject to any disclaimer, the term of this patent is extended or adjusted under 35 U.S.C. 154(b) by 251 days.

(21) Appl. No.: 11/328,873

(22) Filed: Jan. 9, 2006

(65) Prior Publication Data
US 2007/0023083 A1 Feb. 1, 2007

(30) Foreign Application Priority Data
Jul. 28, 2005 (TW) .............................. 94125658 A

(51) Int. Cl.
*F16K 15/20* (2006.01)
(52) U.S. Cl. .................... 137/226; 137/493.3
(58) Field of Classification Search ................ 137/226, 137/228, 493.3, 493.4
See application file for complete search history.

(56) References Cited

U.S. PATENT DOCUMENTS

| | | | | | |
|---|---|---|---|---|---|
| 1,053,623 | A | * | 2/1913 | McMillion | ................... 137/226 |
| 1,064,526 | A | * | 6/1913 | Noe | ........................... 137/226 |
| 1,334,985 | A | * | 3/1920 | Brown | ........................ 137/226 |
| 1,865,231 | A | * | 6/1932 | Buck | ........................... 137/223 |
| 2,606,570 | A | * | 8/1952 | Buenik | ..................... 137/226 |
| 2,825,356 | A | * | 3/1958 | Brown | ..................... 137/493.3 |
| 3,580,273 | A | * | 5/1971 | Schwarz | .................. 137/493.2 |
| 3,994,312 | A | * | 11/1976 | Tanner et al. | ............... 137/226 |
| 4,286,253 | A | * | 8/1981 | Nagy | ....................... 200/61.25 |
| 5,029,604 | A | * | 7/1991 | Spektor et al. | ............... 137/226 |
| 5,103,670 | A | * | 4/1992 | Wu et al. | .................... 73/146.8 |
| 5,320,181 | A | * | 6/1994 | Lantier et al. | ............... 166/386 |
| 5,394,446 | A | * | 2/1995 | White et al. | ................. 376/245 |
| 5,479,975 | A | * | 1/1996 | Fogal et al. | .................. 152/429 |
| 5,582,202 | A | * | 12/1996 | Schultz et al. | ........... 137/493.3 |
| 5,618,361 | A | * | 4/1997 | Colussi et al. | .............. 152/416 |
| 6,079,445 | A | * | 6/2000 | Huang | .................... 137/614.04 |
| 2001/0023613 | A1 | * | 9/2001 | Lemberger et al. | ......... 73/146.8 |

FOREIGN PATENT DOCUMENTS

TW 578706 9/2000

* cited by examiner

*Primary Examiner*—John Rivell
*Assistant Examiner*—Craig Price
(74) *Attorney, Agent, or Firm*—Pai Patent & Trademark Law Firm; Chao-Chang David Pai

(57) ABSTRACT

A two-way check valve includes a sleeve, a connection head, a valve stem eject-rod, a first valve body, a second valve body, a first pressure adjustment module, a second pressure adjustment module and an intake connector. The sleeve is threaded over the valve stem eject-rod and the intake connector at opposite ends thereof, respectively. The connection head is disposed at the valve stem eject-rod. The sleeve has a first sleeve portion and a second sleeve portion. A first receiving chamber and a second receiving chamber are respectively defined in the first sleeve portion and the second sleeve portion. The first receiving chamber receives the second valve body therein. The second valve body is defined with a receiving room therein for receiving the first valve body and the first pressure adjustment module. The second receiving chamber receives the second pressure adjustment module.

17 Claims, 4 Drawing Sheets

TWO-WAY CHECK VALVE

RELATED APPLICATIONS

The present application is based on, and claims priority from, Taiwan Application Serial Number 94125658, filed Jul. 28, 2005, the disclosure of which is hereby incorporated by reference herein in its entirety.

FIELD OF THE INVENTION

The present invention relates to a two-way check valve, and particularly to a check valve enabling a two-way check for a high-pressure gas or fluid flowing through the check valve.

BACKGROUND OF THE INVENTION

A typical tire pump or tire pressure gauge is pressed onto the valve stem of a tire to detect pressure inside the tire. A conventional tire pump mainly includes an air-filled nozzle, a pressure gauge and an intake controller connected with an air compressor. A user can input high-pressure air generated by the air compressor through the valve stem into the tire by controlling the intake controller and measuring the pressure inside the tire by disposing the pressure gauge along the same channel as the valve steam. However, since it is hard to inflate the tire to a proper pressure (that is, the tire is easily overinflated or underinflated), it is often necessary to interatively decrease or increase the pressure inside the tire to obtain the proper pressure, which is inconvenient and increases the possibility of improperly inflating the tire such that driving is made hazardous.

Taiwan Patent Publication No. 578706 discloses a tire pressure sensor disposed directly inside a tire. Though it is convenient for the tire pressure sensor to detect the pressure inside the tire, it is inconvenient to install or detach the tire pressure sensor. In order for the tire pressure sensor to be installed and used conveniently, the sensor is directly secured to the valve stem outside the tire. However, this makes inflating inconvenient and providing proper pressure inside the tire difficult.

SUMMARY OF THE INVENTION

An object of the present invention is to provide a two-way check valve wherein when high-pressure gas (or fluid) enters from an intake hole at one end of the two-way check valve, the high-pressure gas (or fluid) can push a first valve body and enter into an object to be inflated at the other end of the two-way check valve when the pressure of the high-pressure gas is increased; and when the pressure of the inside of the object to be inflated exceeds an upper limit of a given pressure range of the first valve body, the high-pressure gas (or fluid) inside the object to be inflated automatically closes the first valve body, pushes the second valve body and then vents outward from the intake hole, thereby maintaining a constant pressure inside the object to be inflated at the other end of the two-way check valve.

Another object of the present invention is to provide a two-way check valve which can adjust and control the pressure of a high-pressure gas (or fluid) inside an object to be inflated via venting from a second valve body by adjusting pressure exerted at the second valve body.

A further object of the present invention is to provide a two-way check valve which is adjustable to a given tire pressure and is applied to a tire pressure sensor for outputting high-pressure gas in one direction in order to transmit pressure of a tire to a tire pressure sensor for sensing the pressure of the tire.

To achieve the above objects, a two-way check valve of the present invention mainly includes a sleeve having a first sleeve portion and a second sleeve portion, the inner diameter of the first sleeve portion being less than that of the second sleeve portion; a first receiving chamber and a second receiving chamber being respectively defined in the first sleeve portion and the second sleeve portion, an inward protruding shoulder being formed between the first receiving chamber and the second receiving chamber; a valve stem eject-rod defined with an exhaust hole, the lower end of the valve stem eject-rod being threaded into the first sleeve portion; a connection head being a sleeve, the lower portion of the connection head being connected with the valve stem eject-rod which is connectable to an object to be inflated; an intake connector provided with an intake hole, the intake connector having a first threaded connection portion and a second threaded connection portion, the first threaded connection portion connecting to the second sleeve portion; a second valve body having an inner thread at one end thereof which is open and a channel at the other end thereof, the second valve body being provided with a hollow receiving room therein, a blocking surface being formed between the receiving room and the channel, the second valve body being received in the first receiving chamber and movable longitudinally within the first receiving chamber, an end of the second valve body having the channel extending into the second receiving chamber, a protruding annular portion being formed at the outer surface of the second valve body and corresponding to the inward protruding shoulder; a first valve body received in the receiving room of the second valve body and movable longitudinally within the receiving room, the first valve body having a push rod at one end thereof for being received in the channel of the second valve body, and a protruding ring at the other end thereof; a first pressure adjustment module having a first compression resilient member and a first adjustment nut, the first adjustment nut being threaded into the inner thread of the second valve body and having a first throughhole defined therethrough, the first compression resilient member being disposed between the first adjustment nut and the protruding ring of the first valve body whereby the first valve body bears the resilience of the first compression resilient member towards the end of the second valve body having the channel, and the protruding ring is pushed to abut against the blocking surface of the second valve body by the resilience of the first compression resilient member; and a second pressure adjustment module having a second compression resilient member and a second adjustment nut, the second compression resilient member being disposed at one end of the second valve body having the channel, the second adjustment nut being threaded on the inner thread of the second sleeve portion of the sleeve and being provided with a second through-hole whereby the second compression resilient member is positioned between the second valve body and the second adjustment nut, the second pressure adjustment module providing resilience whereby the second valve body bears the resilience of the second pressure adjustment module towards the open end of the first receiving chamber for achieving close abutment and air-tightness between the oil seal ring at the top surface of the protruding annular portion of the second valve body and the inward protruding shoulder.

These and other embodiments, aspects and features of the invention will be better understood from a detailed description of the preferred embodiments of the invention, which are further described below in conjunction with the accompanying drawings.

DETAILED DESCRIPTION OF THE PREFERRED EMBODIMENT

Figure 1:
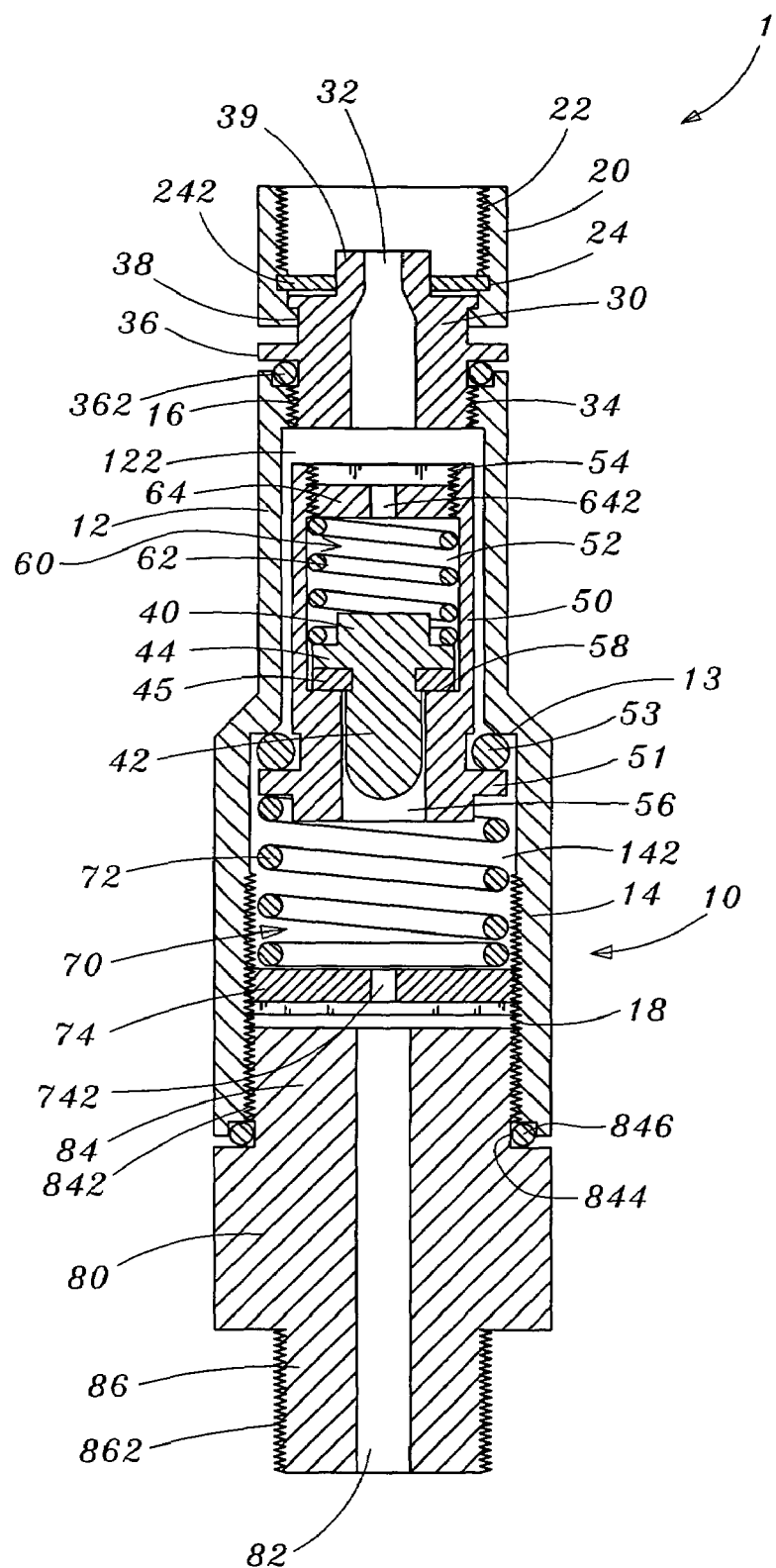
FIG. 1 is a cross-sectional view of a two-way check valve in accordance with a first embodiment of the present invention.

Referring to FIG. 1 which is a cross-sectional view of an embodiment of the present invention, a two-way check valve 1 of the present invention includes a sleeve 10, a connection head 20, a valve stem eject-rod 30, a first valve body 40, a second valve body 50, a first pressure adjustment module 60, a second pressure adjustment module 70 and an intake connector 80. In assembly, the sleeve 10 is respectively threaded onto the valve stem eject-rod 30 and the intake connector 80 at opposite ends thereof. The valve stem eject-rod 30 is connected with and partially received in the connection head 20. Furthermore, the sleeve 10 has a first sleeve portion 12 and a second sleeve portion 14. A first receiving chamber 122 and a second receiving chamber 142 are respectively defined in the first sleeve portion 12 and the second sleeve portion 14. The second valve body 50 is received in the first receiving chamber 122. The second valve body 50 is formed with a receiving room 52, which receives the first valve body 40 and the first pressure adjustment module 60 therein. The second receiving chamber 142 receives the second pressure adjustment module 70 therein.

The sleeve 10 is a hollow pipe with a first inner thread 16 and a second inner thread 18 respectively provided at inner surfaces of opposite open ends of the sleeve 10 for respectively threading over the valve stem eject-rod 30 and the intake connector 80. The sleeve 10 includes the first sleeve portion 12 and the second sleeve portion 14. The open end of the first sleeve portion 12 threads over the valve stem eject-rod 30 via the first inner thread 16. The second sleeve portion 14 threads over the intake connector 80 via the second inner thread 18. The inner diameter of the first sleeve portion 12 is less than that of the second sleeve portion 14. The first receiving chamber 122 and the second receiving chamber 142 are respectively defined inside the first sleeve portion 12 and the second sleeve portion 14. An inward protruding shoulder 13 is formed between the first receiving chamber 122 and the second receiving chamber 142 due to the difference of the inner diameters of the first and second sleeve portions 12, 14.

An exhaust hole 32 is defined in the axis of the valve stem eject-rod 30. A third outer thread 34 is provided at the outer surface of the lower end of the valve stem eject-rod 30 for threadedly engaging with the first sleeve portion 12. A first protruding ring 36 extends from the outer surface of the valve stem eject-rod 30. A first oil seal ring 362 is disposed underneath the first protruding ring 36 for forming an airtight joint between the valve stem eject-rod 30 and the first sleeve portion 12 when the valve stem eject-rod 30 is threaded into the first sleeve portion 12. A first annular recess 38 is defined in the upper end of the valve stem eject-rod 30 for receiving and connecting the connection head 20. A projecting mouth 39 projects upwardly from the upper end of the valve stem eject-rod 30.

The connection head 20 is a sleeve with the lower portion thereof being received in the first annular recess 38 of the valve stem eject-rod 30. A third inner thread 22 is provided in the inner surface of the connection head 20 for threadedly engaging an object to be measured, for example a tire valve stem. An inner annular recess 24 is defined in the inner surface of the connection head 20. A first rubber gasket 242 is disposed at the projecting mouth 39 of the valve stem eject-rod 30 and received in the inner annular recess 24 of the connection head 20.

The intake connector 80 is an elongated column with an intake hole 82 extending through the axis thereof. The intake connector 80 is provided with a first threaded connection portion 84 and a second threaded connection portion 86. The first threaded connection portion 84 and the second threaded connection portion 86 are respectively provided with a first outer thread 842 and a second outer thread 862 at the outer surfaces thereof. The first threaded connection portion 84 is threaded into the second sleeve portion 14 of the sleeve 10. A second annular recess 844 is defined in the outer surface of the first threaded connection portion 84. The second annular recess 844 receives a second oil seal ring 846 therein for forming an airtight connection with the second sleeve portion 14.

The second valve body 50 is a hollow column and has a fourth inner thread 54 provided at one end thereof which is open and a channel 56 at the other end. A hollow receiving room 52 is defined inside the second valve body 50. A blocking surface 58 is formed between the receiving room 52 and the channel 56. The second valve body 50 is received inside the first receiving chamber 122 and is movable longitudinally inside the first receiving chamber 122. An end of the second valve body 50 having the channel 56 extends inside the second receiving chamber 142. A protruding annular portion 51 is disposed at the outer surface of the second valve body 50, corresponding to the inward protruding shoulder 13. The second valve body 50, between the protruding annular portion 51 and the inward protruding shoulder 13, is provided with a third oil seal ring 53.

The first valve body 40 and the first pressure adjustment module 60 are received inside the receiving room 52 of the second valve body 50. The first pressure adjustment module 60 has a first compression resilient member 62 and a first adjustment nut 64. The first adjustment nut 64 is threaded on the fourth inner thread 54 of the second valve body 50 and is defined with a first through-hole 642 for ventilation. The first valve body 40 has a push rod 42 at one end thereof. The push rod 42 is received inside the channel 56 of the second valve body 50. The first valve body 40 has a second protruding ring 44 at the other end thereof. The first compression resilient member 62 is disposed between the second protruding ring 44 and the first adjustment nut 64. The first valve body 40 is movable longitudinally along the receiving room 52 within the second valve body 50. That is, the first pressure adjustment module 60 can provide resilience to the first valve body 40 and adjust a given pressure value of the first valve body 40, whereby the first valve body 40 is forced by the resilience of the first compression resilient member 62 and moves toward the end of the second valve body 50 having the channel 56, and the second protruding ring 44 is pushed toward the blocking surface 58 by the resilience of the first compression resilient member 62. A second rubber gasket 45 is disposed at the outer surface of the push rod 42 between the second protruding ring 44 and the blocking surface 58 for enhancing airtightness between the second protruding ring 44 and the blocking surface 58.

The second pressure adjustment module 70 has a second compression resilient member 72 and a second adjustment nut 74. The second compression resilient member 72 is connected to the end of the second valve body 50 having the channel 56. The second adjustment nut 74 is threaded on the second inner thread 18 of the second sleeve portion 14 whereby the second compression resilient member 72 is positioned between the second valve body 50 and the second adjustment nut 74. The second pressure adjustment module 70 provides resilience to the second valve body 50 and adjusts a given pressure value of the second valve body 50 whereby the second valve body 50 is forced by the resilience of the second pressure adjustment module 70 and moves toward the open end of the first receiving chamber 122. Therefore, a close union is formed between the protruding annular portion 51 and the third oil seal ring 53 of the second valve body 50 and the inward protruding shoulder 13, thereby having an airtight effect. The second adjustment nut 74 is provided with a second through-hole 742 for ventilation.

Figure 3:
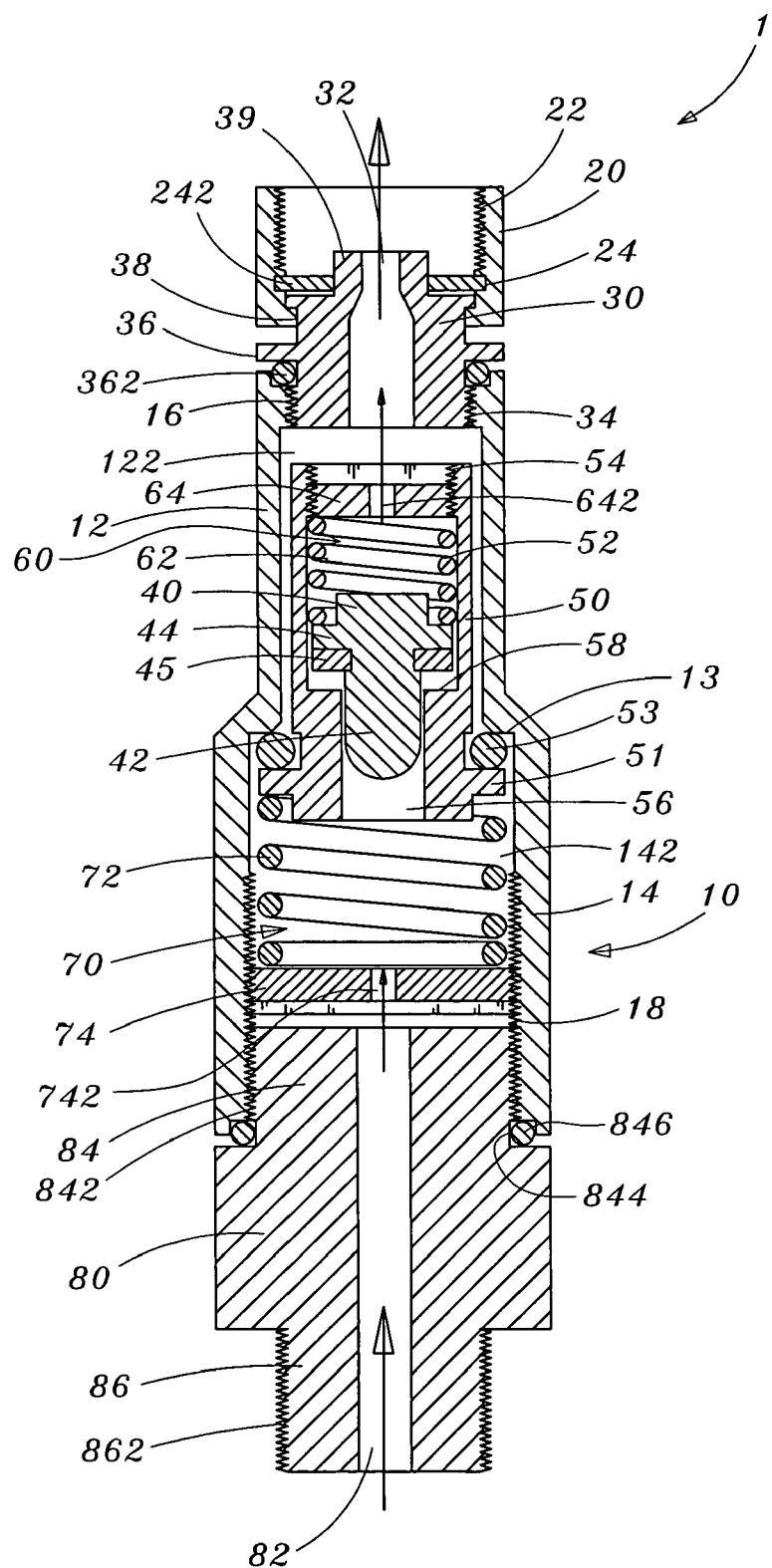
FIG. 3 is a schematic view showing inflation of a vehicle tire mounted with the two-way check valve of FIG. 1.
Figure 4:
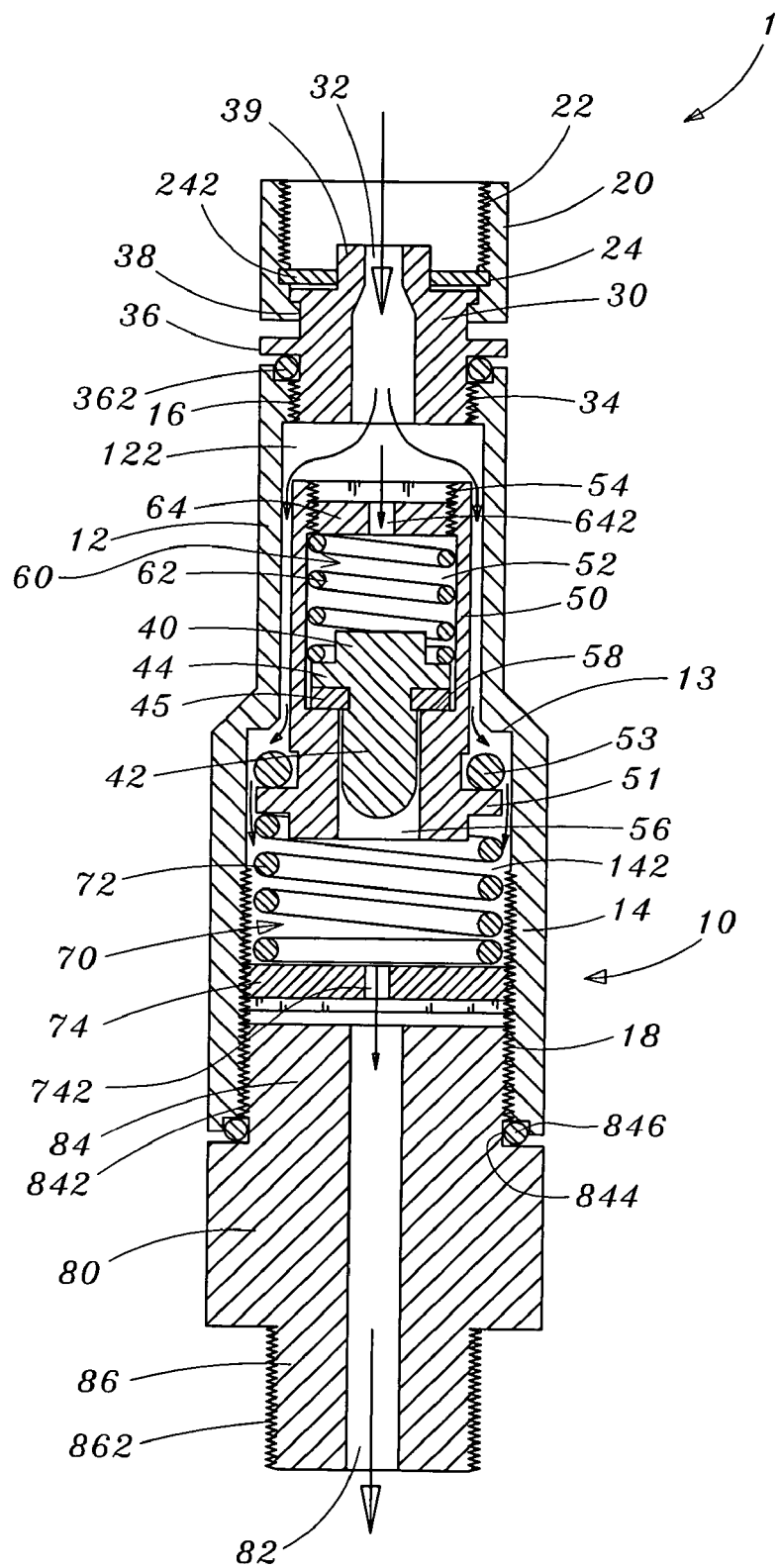
FIG. 4 is a schematic view showing stopping of air-intake after a tire is inflated sufficiently when the two-way check valve of FIG. 1 is applied to a vehicle tire.

Referring to FIGS. 3 and 4, while inflation, the connection head 20 of the two-way check valve 1 of the present invention is connected to an object to be inflated (for example, a valve stem of a tire, air trough or pressure trough, not shown in FIGS. 3 and 4) whereby compressed air enters through the intake hole 82 of the two-way check valve. When the pressure of the inflated air is higher than the given pressure value of the first valve body 40 (i.e. the setting relationship between the first compression resilient member 62 and the first adjustment nut 64), the first valve body 40 is opened and air flows into the object to be inflated (as shown in FIG. 3). However, when the pressure inside the object to be inflated exceeds the setting pressure of the second valve body 50 (i.e. the setting relationship between the second compression resilient member 72 and the second adjustment nut 74) and the inflation is stopped, the high-pressure air inside the object to be inflated automatically closes the first valve body 40, simultaneously opening the second valve body 50, and flowing outward from the intake hole 82 (as shown in FIG. 4), thereby maintaining a constant pressure inside the object to be inflated. Moreover, the setting pressure value of the object to be inflated can be adjusted by adjusting and controlling the resilience of the second compression resilient member 72 between the second valve body 50 and the second adjustment nut 74 so as to adjust the force applied on the second valve body 50.

Figure 2:
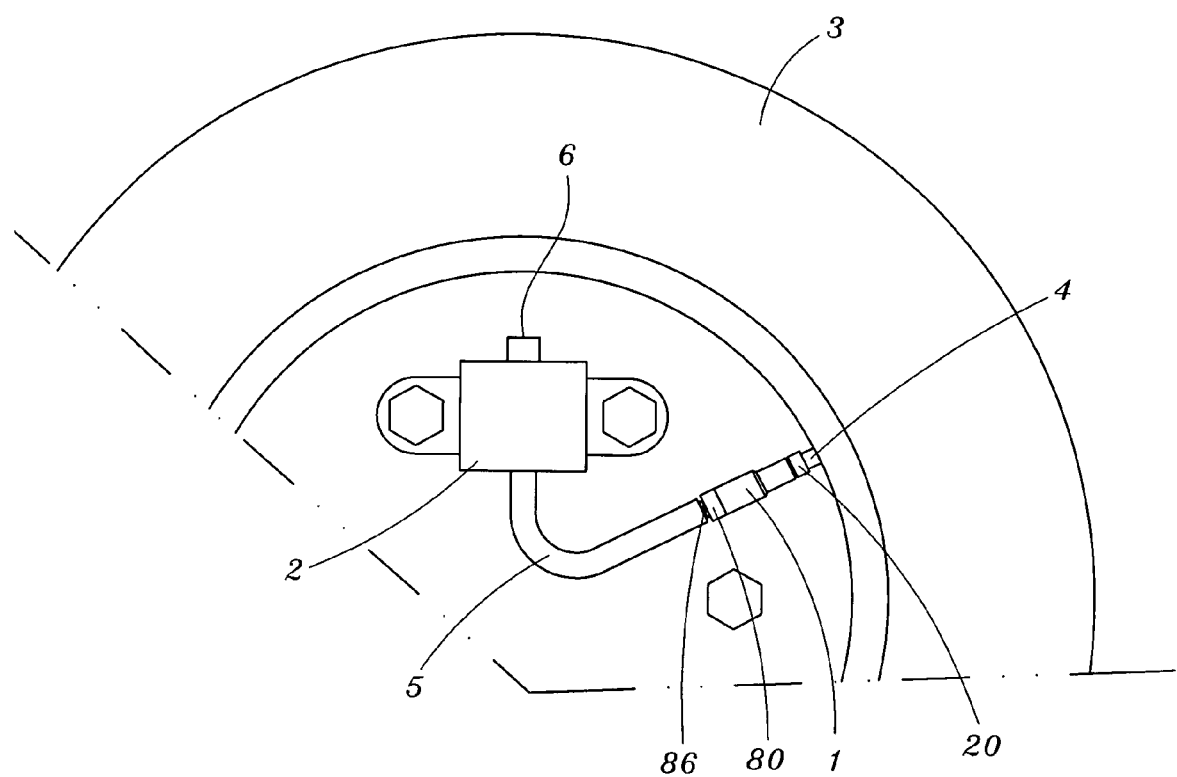
FIG. 2 is a schematic view showing the two-way check valve of FIG. 1 assembled on a tire.

The two-way check valve of the present invention may guide the pressure of the vented air of the second valve body 50 to a connection pipe of a pressure-measuring device. That is, the two-way check valve of the present invention may be used to connect a connection pipe of an air compressor, of a pressure sensor or of a tire pump and of a tire pressure sensor of a vehicle. An embodiment of the present invention shows that the two-way check valve is applied to a tire pressure sensor of a vehicle. As shown in FIG. 2, a connection head 20, at one end of the two-way check valve 1, is threaded onto a tire valve stem 4 of a vehicle tire 3. A second threaded connection portion 86 of an intake connector 80 at the other end of the two-way check valve 1 is connected with the tire pressure sensor 2 through a connection pipe 5.

Referring to FIG. 3, a schematic view shows inflation of a vehicle tire in accordance with an embodiment of the present invention. When a user wants to inflate a tire 3 through an air inflation nozzle 6 of a tire pressure sensor 2, the filled in high-pressure air is transmitted through a connection pipe 5 and passes through an intake hole 82 of an intake connector 80 of a two-way check valve 1 and into a second receiving chamber 142 of a sleeve 10 via the intake hole 82 and a second through-hole 742 of a second adjustment nut 74. The high-pressure air generated from air inflation pushes a first valve body 40 to move toward a first adjustment nut 64 of a first pressure adjustment module 60, thereby releasing airtightness between a second rubber gasket 45 of a second protruding ring 44 of the first valve body 40 and a blocking surface 58. Therefore, high-pressure air enters a receiving room 52 through a channel 56 and then enters the tire 3 through a first through-hole 642, a first receiving chamber 122, an exhaust hole 32 and a tire valve stem 4 for inflating the tire 3. At this time, since the tire pressure sensor 2 is in communication with the inside of the tire 3 through the open first valve body 40, the tire pressure sensor 2 can indicate pressure of the inside of the tire 3. The air inflation nozzle 6 is in communication with the tire pressure sensor 2 and has a structure of a one-way check valve (not shown) of a conventional tire valve stem 4.

In addition, referring to FIG. 4, a schematic view shows stopping inflation when a vehicle tire 3 is inflated sufficiently, according to an embodiment of the present invention. When the vehicle tire 3 is inflated sufficiently, since the pressure of the vehicle tire 3 is greater than the setting pressure of the second valve body 50, remained high-pressure air flows back from an exhaust hole 32 to a first receiving chamber 122, enters a receiving room 52 of the second valve body 50 through a first through-hole 642, and then pushes a first valve body 40 to move toward an end of a channel 56. Therefore, a second rubber gasket 45 of a second protruding ring 44 and a blocking surface 58 forms a close union for preventing external high-pressure air from continuing to flow into the tire 3 through the first valve body 40. Furthermore, at the same time, since the first valve body 40 is closed, the remained high-pressure air flows through the first receiving chamber 122 into the second receiving chamber 142. Therefore, the high-pressure air inside the tire pushes the second valve body 50 to move toward the second receiving chamber 142 and releases airtightness between a third oil seal ring 53 of a protruding annular portion 51 and an inward protruding shoulder 13. Thus, the high-pressure air inside the tire flows through a gap between the second valve body 50 and the first receiving chamber 122, flows from the first receiving chamber 122 to the second receiving chamber 142, and then sequentially flows through a second through-hole 742 of a second adjustment nut 74, an intake hole 82 and a connection pipe 5 into a tire pressure sensor 2. The tire pressure sensor 2 detects the high-pressure air to generate a detected value and stops inflating the tire. That is, the tire pressure sensor 2 can respond to the pressure status inside the tire 3 at any moment and detects the pressure of the tire 3 for avoiding excessive or insufficient air inflation that might result in hazardous driving.

Furthermore, the second pressure adjustment module 70 may be threadedly engaging with the second inner thread 18 of the second receiving chamber 142 through a second adjustment nut 74 for adjusting and controlling resilience of the second compression resilient member 72 between the second valve body 50 and the second adjustment nut 74. Thus, the high-pressure air inside the tire 3 may be vented at different pressures inside the tire 3 in accordance with different resilience. In other words, the pressure of the inflated air inside the tire 3 can be adjusted and set through the two-way check valve 1 of the present invention.

It is understood from the above description that the present invention can be applied not only to a tire pressure sensor of a vehicle tire, but also to any device or object which requires to input one-way high-pressure gas or fluid with a restricted or constant pressure.

The preferred embodiments, aspects, and features of the invention have been described in detail. It will be apparent to those skilled in the art that numerous variations, modifications and substitutions may be made without departing from the spirit of the invention as disclosed and further claimed below.

What is claimed is:

1. A two-way check valve comprising
    a sleeve being a hollow pipe, the sleeve having a first inner thread and a second inner thread respectively at inner surfaces of opposite ends thereof, the sleeve having a first sleeve portion and a second sleeve portion, an inner diameter of the first sleeve portion being less than that of the second sleeve portion, the first sleeve portion and the second sleeve portion being respectively defined with a first receiving chamber and a second receiving chamber therein, an inward protruding shoulder being formed between the first receiving chamber and the second receiving chamber;
    a valve stem eject-rod having an exhaust hole defined along an axis of the valve stem, the valve stem eject-rod having at its lower surface a third outer thread for threading into the first sleeve portion;
    a connection head being a hollow sleeve, the bottom portion of the connection head connecting to the valve stem eject-rod, a third inner thread being provided at the inner surface of the connection head;
    an intake connector being an elongated column with an intake hole being defined in the axis thereof, the intake connector including a first threaded connection portion and a second threaded connection portion, the first threaded connection portion and the second threaded connection portion respectively having a first outer thread and a second outer thread at a surface thereof, the first threaded connection portion being threaded into the second sleeve portion;
    a second valve body being a hollow column, the second valve body having a fourth inner thread at one end thereof which is open and a channel at the other end thereof, the second valve body being defined with a hollow receiving room therein, a blocking surface being formed between the receiving room and the channel, the second valve body being received in the first receiving chamber and being movable longitudinally within the first receiving chamber, an end of the second valve body having the channel extending into the second receiving chamber, a protruding annular portion being provided at the outer surface of the second valve body corresponding to the inward protruding shoulder;
    a first valve body received in the receiving room of the second valve body and movable longitudinally within the receiving room, the first valve body having a push rod at one end thereof for being received in the channel and a second protruding ring at the other end thereof;
    a first pressure adjustment module having a first compression resilient member and a first adjustment nut, the first adjustment nut being threaded on the fourth inner thread of the receiving room of the second valve body and being defined with a first through-hole for ventilation, the first compression resilient member being disposed between the first adjustment nut and the second protruding ring of the first valve body whereby the first valve body is forced by the resilience of the first compression resilient member and moved toward the channel of the second valve body, and the second protruding ring is pushed toward the blocking surface by the resilience of the first compression resilient member; and
    a second pressure adjustment module having a second compression resilient member and a second adjustment nut, the second compression resilient member being disposed at one end of the second valve body having the channel, the second adjustment nut being threadedly engaged with the second inner thread of the second sleeve portion whereby the second compression resilient member is positioned between the second valve body and the second adjustment nut, the second pressure adjustment module providing a resilience whereby the second valve body is forced by the resilience of the second pressure adjustment module and moved toward the open end of the first receiving chamber for achieving a close union and airtightness between the protruding annular portion of the second valve body and the inward protruding shoulder; the second adjustment nut being defined with a second through-hole for ventilation.

2. The two-way check valve of claim 1, wherein the valve stem eject-rod has a first protruding ring at a surface thereof, a first oil seal ring is disposed at the bottom surface of the first protruding ring whereby when the valve stem eject-rod is threaded into the first sleeve portion, the first oil seal ring achieves airtightness between the valve stem eject-rod and the first sleeve portion.

3. The two-way check valve of claim 1, wherein the valve stem eject-rod is defined with a first annular recess at the upper end thereof for connecting the connection head.

4. The two-way check valve of claim 1, wherein the valve stem eject-rod has a projecting mouth outwardly protruding from the top thereof.

5. The two-way check valve of claim 4, wherein the connection head is defined with an inner annular recess at the inner surface thereof, the projecting mouth of the valve stem eject-rod is provided with a first rubber gasket which is positioned in the inner annular recess.

6. The two-way check valve of claim 1, wherein the second valve body between the protruding annular portion and the inward protruding shoulder is provided with a third oil seal ring.

7. The two-way check valve of claim 1, wherein the push rod between the second protruding ring of the first valve body and the blocking surface is provided with a second rubber gasket at the outer surface thereof for enhancing airtightness between the second protruding ring and the blocking surface.

8. The two-way check valve of claim 1, wherein a second annular recess is defined in the outer surface of the first threaded connection portion of the intake connector, the second annular recess receives a second oil seal ring whereby when the intake connector is threaded on the second sleeve portion, the second oil seal ring achieves airtightness between the intake connector and the second sleeve portion.

9. A two-way check valve adapted for a tire pressure sensor having an end threaded on a valve stem of a vehicle tire and the other end connected to a tire pressure sensor through a connection pipe, the two-way check valve comprising:
    a sleeve being a hollow tube, the hollow sleeve having a first inner thread and a second inner thread respectively at inner surfaces of opposite open ends thereof, the sleeve having a first sleeve portion and a second sleeve portion, an inner diameter of the first sleeve portion being less than that of the second sleeve portion, the first sleeve portion and the second sleeve portion being respectively defined with a first receiving chamber and a second receiving chamber therein, an inward protruding shoulder being formed between the first receiving chamber and the second receiving chamber;

a valve stem eject-rod having an exhaust hole defined in the axis of the valve stem, the valve stem eject-rod having a third outer thread at the lower surface thereof for threading into the first sleeve portion;

a connection head being a hollow sleeve with a bottom portion thereof receiving the valve stem eject-rod, the connection head having a third inner thread at the inner surface thereof for threading on the tire valve stem;

an intake connector being an elongated column with an intake hole being defined in the center of the axis thereof, the intake connector having a first threaded connection portion and a second threaded connection portion, the first threaded connection portion and the second threaded connection portion respectively having a first outer thread and a second outer thread at a surface thereof, the first threaded connection portion threading in the second sleeve portion, the second threaded connection portion threading on an end of the connection pipe;

a second valve body being a hollow column, the second valve body having a fourth inner thread at an end thereof which is open and a channel at the other end thereof, the second valve body being defined with a hollow receiving room therein, a blocking surface being formed between the receiving room and the channel, the second valve body being received in the first receiving chamber and movable longitudinally within the first receiving chamber, an end of the second valve body having the channel extending into the second receiving chamber, a protruding annular portion being formed at the outer surface of the second valve body corresponding to the inward protruding shoulder;

a first valve body received in the receiving room of the second valve body and movable longitudinally within the receiving room, the first valve body having a push rod at one end thereof for being received in the channel, and a second protruding ring at the other end thereof;

a first pressure adjustment module having a first compression resilient member and a first adjustment nut, the first adjustment nut being threadedly engaged with the fourth inner thread of the second valve body receiving room and being defined with a first through-hole for ventilation, the first compression resilient member being assembled between the first adjustment nut and the second protruding ring of the first valve body whereby the first valve body is forced by resilience of the first compression resilient member and moved toward an end of the second valve body having the channel, and the second protruding ring is pushed toward the blocking surface by the resilience of the first compression resilient member; and a second pressure adjustment module having a second compression resilient member and a second adjustment nut, the second compression resilient member being assembled at an end of the second valve body having the channel, the second adjustment nut being threadedly engaged with the second inner thread of the second sleeve portion whereby the second compression resilient member is positioned between the second valve body and the second adjustment nut, the pressure adjustment module providing a resilience whereby the second valve body is forced by the resilience of the second pressure adjustment module and moved towards the open end of the first receiving chamber for achieving a close joint and airtightness between the protruding annular portion of the second valve body and the inward protruding shoulder; the second adjustment nut being defined with a second through-hole for ventilation.

10. The two-way check valve of claim 9, wherein the valve stem eject-rod has a first protruding ring at a surface thereof, a first oil seal ring is disposed at the bottom surface of the first protruding ring whereby when the valve stem eject-rod is threaded in the first sleeve portion, the first oil seal ring achieves airtightness between the valve stem eject-rod and the first sleeve portion.

11. The two-way check valve of claim 9, wherein the valve stem eject-rod is defined with a first annular recess at the upper end thereof for connecting the connection head.

12. The two-way check valve of claim 9, wherein the valve stem eject-rod has a projecting mouth outwardly protruding from the top thereof 13. The two-way check valve of claim 12, wherein the connection head is defined with an inner annular recess at the inner surface thereof, the projecting mouth of the valve stem eject-rod is disposed with a first rubber gasket which is positioned in the inner annular recess.

14. The two-way check valve of claim 9, wherein the second valve body between the protruding annular portion and the inward protruding shoulder is provided with a third oil seal ring.

15. The two-way check valve of claim 9, wherein the push rod between the second protruding ring of the first valve body and the blocking surface is provided with a second rubber gasket at the outer surface thereof for enhancing airtightness between the second protruding ring and the blocking surface.

16. The two-way check valve of claim 9, wherein the tire pressure sensor has an air inflation nozzle, the air inflation nozzle is in communication with the tire pressure sensor and has a structure of a one-way check valve.

17. The two-way check valve of claim 9, wherein a second annular recess is defined in the outer surface of the first threaded connection portion of the intake connector, the second annular recess receives a second oil seal ring whereby when the intake connector is threaded into the second sleeve portion, the second oil seal ring achieves airtightness between the intake connector and the second sleeve portion.

* * * * *